UNITED STATES PATENT OFFICE.

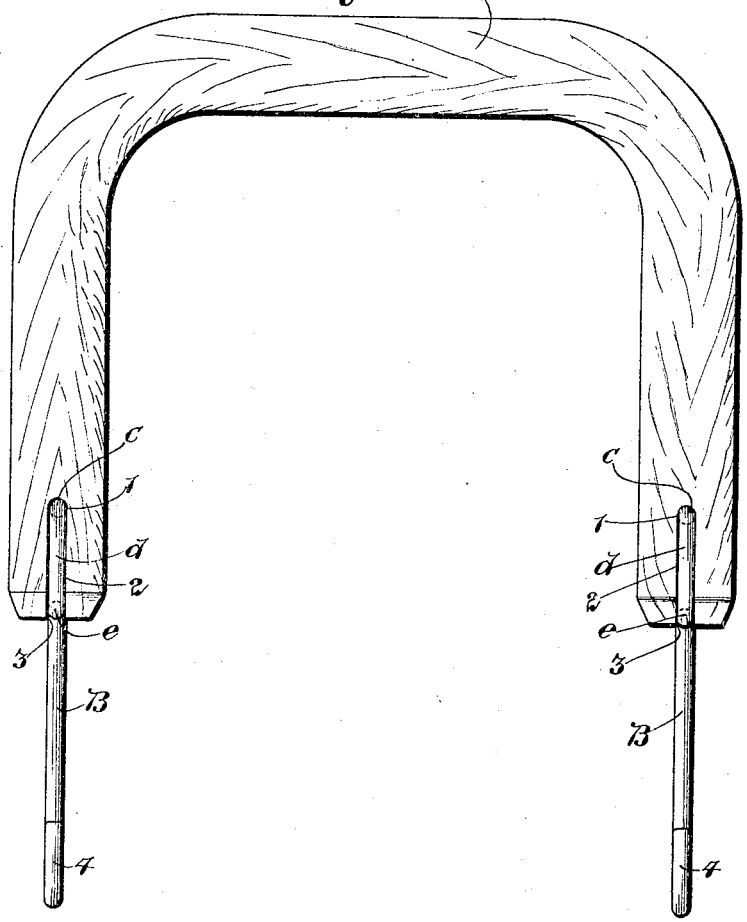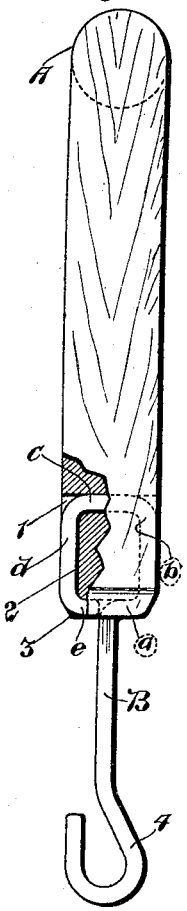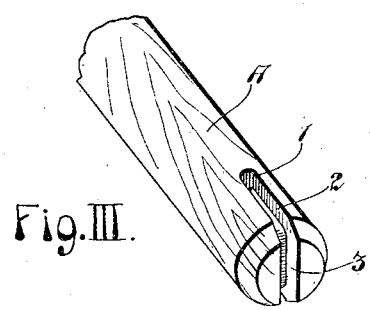

GEORGE H. ROLFES, OF ST. LOUIS, MISSOURI, ASSIGNOR TO HANDLAN BUCK MANUFACTURING COMPANY, OF ST. LOUIS, MISSOURI, A CORPORATION OF MISSOURI.

LANTERN-BAIL.

1,327,293.

Specification of Letters Patent.

Patented Jan. 6, 1920.

Application filed April 18, 1919. Serial No. 291,160.

*To all whom it may concern:*

Be it known that I, GEORGE H. ROLFES, a citizen of the United States of America, a resident of the city of St. Louis, in the State of Missouri, have invented certain new and useful Improvements in Lantern-Bails, of which the following is a full, clear, and exact description, reference being had to the accompanying drawings, forming a part of this specification.

My invention relates to an improvement in bails, intended more particularly for use upon lanterns used in railway signaling. The invention has for its object, to provide a bail of this kind which includes the usual wire members for the attachment of the bail to the lantern and a grip handle of larger proportions than the wire connection members which may be readily grasped and held in a person's hand without the discomfort and strain incident to the grasping and manipulation of an all wire bail.

Figure I is a side elevation of my bail.

Fig. II is an end view of the bail, the grip handle being partly in section.

Fig. III is a perspective view of one end of the grip handle.

In the drawing A designates the U-shaped grip handle, and B the wire connection members of my bail for attachment to the ears provided on lanterns for the attachment of bails thereto.

The grip handle A is much larger in diameter than the wire connection members B and is preferably of wood, although it may be made of any other suitable material. Each leg of the U-shaped handle is provided near its end with an aperture 1 extending transversely through the leg, two diametrically opposite grooves 2 leading longitudinally of the leg to the end of the leg and a transverse end groove 3 extending across the end of the leg and joining the longitudinal grooves 2.

The wire connection members B preferably terminate at their free ends in open eyes 4 for application to the bail receiving ears of the lantern, and which may be closed as usual to securely fasten the bail to said ears.

The inner end of each wire connection member B is formed into a loop which is extended through the transverse aperture 1 in the leg of the grip handle A to which the connection member is to be secured, and the connection member is positively secured to said leg by so bending the wire that the portions of the loop, aside from the portion in the transverse aperture, will occupy the grooves 2 and 3. With this object in view the loop at the inner end of each wire connection member is formed by bending the wire after threading the wire through an aperture 1, first laterally, to form a right angle portion $a$, which extends across approximately one-half of the end groove 3, a longitudinal portion $b$, extending along one of the longitudinal grooves 2, a transverse portion $c$, extending through the aperture 1, a second longitudinal portion $d$, occupying the second longitudinal groove 2, and an inturned portion $e$, extending into the end groove 3, toward the body of the wire connection member. By thus forming the loops at the inner ends of the wire connection members, said loops are firmly seated against the walls of the apertures 1, the longitudinal grooves 2, and the end grooves 3, in the legs of the grip handles so that the loops will retain the forms into which they are bent without any liability of being bent out of shape.

The wire of which the wire connection members are made is of a sufficient size, and sufficient rigidity, to obviate the possibility of its being bent, due to strain thereon during the use of the bail when attached to a lantern. Furthermore, it will be noted that the arrangement of the loop at the inner ends of each wire connection member is in alinement with the direction of pivotal action of the bail when attached to a lantern and the loops being embedded in the side and end grooves in the grip handle are so fitted thereto that the strain imposed upon the wire connection members in swinging the lantern without pivotal action, as is customary in railway signaling, the loops cannot yield relative to the grip handle; and there is, in fact, little strain imposed thereon, the strain being taken by the grip handle which is of adequate strength to resist any strain imposed upon it.

While I have described my bail for use upon a lantern, it is evident it may be used upon various other devices, and I, therefore, do not confine myself to the particular use described.

I claim:

1. A bail comprising a U-shaped grip handle having its legs apertured transversely, grooved longitudinally from the transverse apertures, and provided with end grooves; and wire connection members having loops extending through said apertures and embedded in said longitudinal and end grooves.

2. A bail comprising a U-shaped grip handle having its legs apertured transversely, grooved longitudinally from the transverse apertures, and provided with end grooves connecting the longitudinal grooves; and wire connection members having loops extending through said transverse apertures and embedded in said longitudinal and transverse grooves.

3. A bail comprising a U-shaped grip handle each leg of which is provided with a transverse aperture, longitudinal grooves leading from said aperture, and an end groove; and wire connection members secured to the legs of said grip handle, each wire connection member having a loop fitted to one of the handle legs and extending therein first laterally in an end groove, then in a longitudinal groove to and through the transverse aperture in said leg, then in the second longitudinal groove in the leg and into the end groove of said leg.

In testimony that I claim the foregoing I hereunto affix my signature.

GEO. H. ROLFES.